Aug. 30, 1949.   A. A. STEINHILBER   2,480,786
METHOD AND APPARATUS FOR CEMENTING RUBBER ARTICLES
Filed Nov. 3, 1945
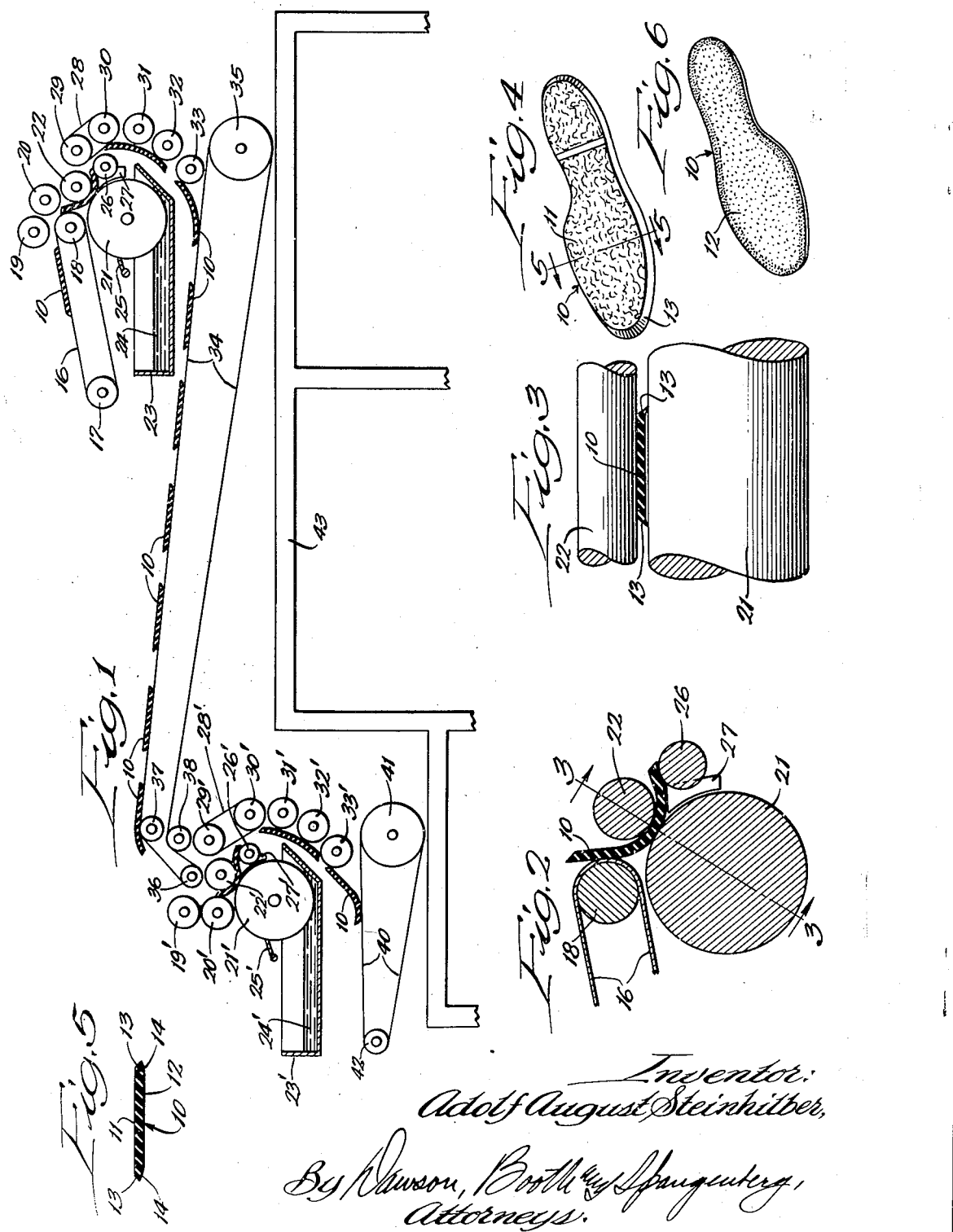
Inventor:
Adolf August Steinhilber,
By Dawson, Booth & Spangenberg,
Attorneys.

Patented Aug. 30, 1949

2,480,786

UNITED STATES PATENT OFFICE 2,480,786

METHOD AND APPARATUS FOR CEMENTING RUBBER ARTICLES

Adolf August Steinhilber, Rock Island, Ill., assignor to The Servus Rubber Company, a corporation of Illinois Application November 3, 1945, Serial No. 626,489

10 Claims. (Cl. 12—80)

1

This invention relates to the method and apparatus for cementing rubber articles such as rubber soles for application to bodies such as footwear.

In the manufacture of rubber footwear, the parts are cut to fit and are cemented in place instead of being sewed as is the case of leather footwear. These parts, which include the rubber soles and the uppers against which the rubber soles are attached, are usually composed of compounded unvulcanized rubber including either natural or synthetic rubber, or both. The cement utilized is a rubber cement made of compounded unvulcanized natural or synthetic rubber which has been dissolved in a solvent, such as naphtha.

In sticking rubber parts of the footwear together, it is nearly always necessary to freshen the surfaces with either naphtha or the aforementioned cement in order to make the parts adhere to each other during vulcanization. If any of these rubber surfaces have not been freshened or cemented, there will be no adhesion at that spot.

The rubber soles of rubber footwear are cut to the shape of the shoe with a beveled edge all around the outside of the sole. This bevel is always cut right down to a feather edge and is generally known as the skive. When the skive is cut down to a feather edge, these edges tend to lift upwards when the sole lays down flat on a table or passes flat over a cementing roll. When the sole is put through a cementing machine in that flat position, the sharp edges curl away from the cementing roll and do not receive any cement. Close adherence adjacent the edges of a rubber sole to the uppers is therefore difficult and expensive to obtain.

The principal object of this invention is to avoid the above difficulties and provide a method and apparatus for producing proper cementing of rubber soles by insuring proper distribution of the cement over the entire surface of the sole. In carrying out this object of the invention the rubber sole is bent sharply in a reverse curve where it engages the cement roll whereby the feather edge of the sole turns downwardly against the cement roll instead of turning upwardly as it would if it were not so bent. As a result the edges of the sole contact the cement roll and receive cement therefrom. In fact, because of this action, an extra amount of cement is applied adjacent the edges of the sole which, of course, is very advantageous in that it assures good adhesion adjacent the edges of the soles when the soles are applied to the uppers.

Further objects reside in the detailed steps of the method and in the details of construction of the apparatus for performing the method of cementing rubber soles and similar rubber articles as set forth above.

Other objects and advantages will become apparent to those skilled in the art upon reference to the accompanying specification, claims and drawing, in which—

Fig. 1 is a diagrammatic representation of the cementing apparatus;

Fig. 2 is an enlarged sectional view of a portion of the apparatus shown in Fig. 1;

Fig. 3 is a partial sectional view taken substantially along the line 3—3 of Fig. 2;

Fig. 4 is a perspective view of a rubber sole showing the wearing side;

Fig. 5 is a sectional view taken substantially along the line 5—5 of Fig. 4; and Fig. 6 is a perspective view of the rubber sole of Fig. 4 but inverted to show the cemented side thereof.

A substantially flat rubber article such as a rubber sole is generally designated at 10 in Figs. 4, 5 and 6. The rubber sole includes a wearing surface 11 and a cemented surface 12. The rubber sole is composed of compounded unvulcanized rubber including either natural or synthetic rubber or both and the purpose of this invention is to evenly distribute a rubber cement on the cementing surface 12 of the rubber sole so that it may be made to adhere uniformly to the uppers of footwear against which the rubber soles are to be attached. The rubber soles are cut to the shape of the shoe with a beveled edge 13 all around the outside of the sole. This beveled edge 13 is cut down to a feather edge and is generally known as a skive. When the skive is cut down to a feather edge the edges of the sole tend to lift upwards, as shown at 14 in Fig. 5, when the sole lays down flat on a surface or is passed flat over a cementing roll. Thus, when the sole is put through a cementing machine in the flat position as shown in Figs. 4 and 5, the sharp edges curl away from the cementing roll and do not receive any cement. Close adherence adjacent the edges of the rubber sole to the uppers is therefore difficult and expensive to obtain.

This difficulty of curling of the sole is obviated by cementing the soles with the apparatus shown in Fig. 1. There the soles 10 are placed with the wearing side 11 up on a conveyor 16 carried by rolls 17 and 18. Guide rolls 19 and 20 direct the sole 10 between a pair of rolls 21 and 22. The roll 21 carries cement for applying the cement to the cementing side of the sole 10. A container 23 carries a supply of cement 24 therein, the cement preferably being a rubber cement made of compounded unvulcanized natural or synthetic rubber which has been dissolved in a solvent such as naphtha. The roll 21 rotates in a clockwise direction in the cement 24 and carries along the surface thereof a film of cement. The thickness of the cement film is controlled by a blade 25. The sole, after being cemented, is guided from the cement roll 21 by means of a roll 26 and guide 27 and by rolls 31, 32 and 33 onto a conveyor 34 carried by rolls 35, 36, 37 and 38. The rolls 18 and 26 bend the sole sharply in a reverse curve away from the cement roll 21 where it engages the cement roll, as is shown more clearly in Fig. 2. When the sole is bent sharply in a reverse curve in this fashion at its line of engagement with the cement roll, the feather edge of the sole 10 turns downwardly against the cement roll 21 as illustrated in Fig. 3. As a result the edges of the sole firmly contact the cement roll and receive cement therefrom. In fact, because of this extra firm contact adjacent the edges of the sole an extra amount of cement is actually applied adjacent the edges of the sole as in illustrated in Fig. 6. This, of course, is very advantageous in that it assures good adhesion adjacent the edges of the soles when the soles are applied to the uppers.

In the above manner a first coat of cement is applied to the cementing surfaces 12 of the soles 10. The conveyor 34 which carries the soles 10 with the cemented sides thereof on top, delivers the soles with the first coat of cement to another cementing apparatus which for all intent and purposes is identical to the one already considered. The same process is accomplished in this second cementing apparatus as in the first and like reference characters primed for like parts have been utilized. Since the cementing operation of the second cementing apparatus is identical to that of the first, a further description thereof is not considered necessary. However, it is pointed out that preferably the second coat of cement is applied to the cementing surfaces 12 of the soles 10 before the first coat of cement has dried. In this way a very even distribution of cement over the entire surface of the sole is obtained with an extra amount of cement being applied adjacent the edges of the sole.

When the soles are delivered from the second cementing apparatus they are delivered to a conveyor 40 carried by rolls 41 and 42 where they may be conveyed away to a point where the cement is permitted to dry. The complete cementing apparatus thus far described may be carried by suitable framework designated at 43. The various rolls are power driven by means of a motor, gears, chains and sprockets, not shown.

While for purposes of illustration one form of this invention has been disclosed, other forms thereof may become apparent to those skilled in the art upon reference to this disclsure and, therefore, this invention is to be limited only by the scope of the appended claims and prior art.

I claim as my invention:

1. The method of applying cement to a face of a rubber sole having beveled edges which tend to lift the edge portions away from said face comprising, progressively contacting a cement carrying surface with said face of the rubber sole and bending the rubber sole sharply in a reverse curve away from the line of contact with the cement carrying surface to cause the edge portions of said face of the rubber sole to turn against the cement carrying surface for assuring application of cement to the edge portions of said face.

2. The method of applying cement to a face of a rubber sole having beveled edges which tend to lift the edge portions away from said face comprising, progressively contacting a cement carrying roll with said face of the rubber sole and bending the rubber sole sharply in a reverse curve away from the line of contact with the cement carrying roll to cause the edge portions of said face of the rubber sole to turn against the cement carrying roll for assuring application of cement to the edge portions of said face.

3. The method of applying cement to a face of a rubber sole having beveled edges which tend to lift the edge portions away from said face comprising, progressively passing the rubber sole between a pair of rolls, the roll engaging said face of the rubber sole carrying cement, and bending the rubber sole sharply around the non-cement carrying roll in a reverse curve to cause cement to be applied to said face of the rubber sole along the line of contact with the cement carrying roll and to cause the edge portions of said face of the rubber sole to turn against the cement carrying roll for assuring application of cement to the edge portions of said face.

4. Apparatus for applying cement to a face of a rubber sole having beveled edges which tend to lift the edge portions away from said face comprising, a cement carrying surface, and means for progressively contacting the cement carrying surface with said face of the rubber sole and for bending the rubber sole sharply in a reverse curve away from the line of contact with the cement carrying surface to cause the edge portions of said face of the rubber sole to turn against the cement carrying surface for assuring application of cement to the edge portions of said face.

5. Apparatus for applying cement to a face of a rubber sole having beveled edges which tend to lift the edge portions away from said face comprising, a cement carrying roll, and means for progressively contacting the cement carrying roll with said face of the rubber sole and for bending the rubber sole sharply in a reverse curve away from the line of contact with the cement carrying roll to cause the edge portions of said face of the rubber sole to turn against the cement carrying roll for assuring application of cement to the edge portions of said face.

6. Apparatus for applying cement to a face of a rubber sole having beveled edges which tend to lift the edge portions away from said face comprising, a cement carrying roll, a roll closely adjacent thereto, means for passing the rubber sole between the rolls with said face of the rubber sole contacting the cement carrying roll, and means for bending the rubber sole sharply around the non-cement carrying roll in a reverse curve to cause cement to be applied to said face of the rubber sole along the lone of contact with the cement carrying roll and to cause the edge portions of said face of the rubber sole to turn against the cement carrying roll for assuring application of cement to the edge portions of said face.

7. Apparatus for applying cement to a face of a rubber sole having beveled edges which tend to lift the edge portions away from said face comprising, a cement carrying roll, a roll closely adjacent thereto, means for passing the rubber sole between the rolls with said face of the rubber sole contacting the cement carrying roll, and means adjacent to and on opposite sides of the non-cement carrying roll for bending the rubber sole sharply around the non-cement carrying roll in a reverse curve to cause cement to be applied to said face of the rubber sole along the line of contact with the cement carrying roll to cause the edge portions of said face of the rubber sole to turn against the cement carrying roll for assuring application of cement to the edge portions of said face.

8. Apparatus for applying cement to a face of a rubber sole having beveled edges which tend to lift the edge portions away from said face comprising, a cement carrying roll, a roll closely adjacent thereto, means for passing the rubber sole between the rolls with said face of the rubber sole contacting the cement carrying roll, and rolls adjacent to and on opposite sides of the non-cement carrying roll for bending the rubber sole sharply around the non-cement carrying roll in a reverse curve to cause cement to be applied to said face of the rubber sole along the line of contact with the cement carrying roll and to cause the edge portions of said face of the rubber sole to turn against the cement carrying roll for assuring application of cement to the portions of said face.

9. The method of applying cement to a face of a rubber sole having beveled edges which tend to lift th edge portions away from said face comprising, applying a first coat of cement by progressively contacting a cement carrying surface with said face of the rubber sole and bending the rubber sole sharply in a reverse curve away from the line of contact with the cement carrying surface to cause the edge portions of said face of the rubber sole to turn against the cement carrying surface for assuring application of cement to the edge portions of said face, and applying a second coat of cement before the first coat has dried by progressively contacting a cement carrying surface with the initially coated face of the rubber sole and bending the rubber sole sharply in a reverse curve away from the line of contact with the cement carrying surface to cause the edge portions of said face of the rubber sole to turn against the cement carrying surface for assuring application of cement to the edge portions of said face.

10. Apparatus for applying cement to a face of a rubber sole having beveled edges which tend to lift the edge portions away from said face comprising, a first cement carrying surface, means for progressively contacting the first cement carrying surface with said face of the rubber sole and for bending the rubber sole sharply in a reverse curve away from the line of contact with the first cement carrying surface to cause the edge portions of said face of the rubber sole to turn against the cement carrying surface for assuring application of cement to the edge portions of said face, a second element carrying surface, and means for progressively contacting the second cement carrying surface with the initially coated face of the rubber sole and for bending the rubber sole sharply in a reverse curve away from the line of contact with the second cement carrying surface to cause the edge portions of said face of the rubber sole to turn against the cement carrying surface for assuring application of cement to the edge portions of said face.

ADOLF AUGUST STEINHILBER.

REFERENCES CITED

The following references are of record in the file of this patent:

UNITED STATES PATENTS

| Number | Name | Date |
|---|---|---|
| 395,645 | Anderson | Jan. 1, 1889 |
| 1,285,902 | Bazzoni | Nov. 26, 1918 |
| 1,313,510 | Wright | Aug. 19, 1919 |
| 1,766,239 | Zarndorf | June 24, 1930 |
| 1,979,065 | Case | Oct. 30, 1934 |
| 2,025,375 | Cameron et al. | Dec. 24, 1935 |
| 2,060,152 | Whelpley | Nov. 10, 1936 |
| 2,088,947 | Coulson | Aug. 3, 1937 |
| 2,101,987 | Ellis | Dec. 14, 1937 |
| 2,198,699 | Fredericksen | Apr. 30, 1940 |